Nov. 15, 1949        J. M. WALLACE ET AL        2,488,454
PROTECTION OF PARALLEL-CONNECTED CONDENSERS
Filed May 10, 1946
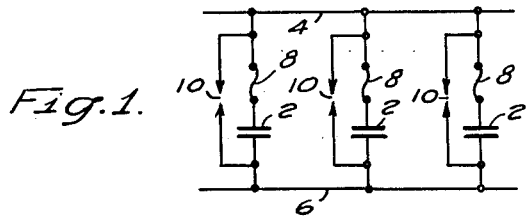
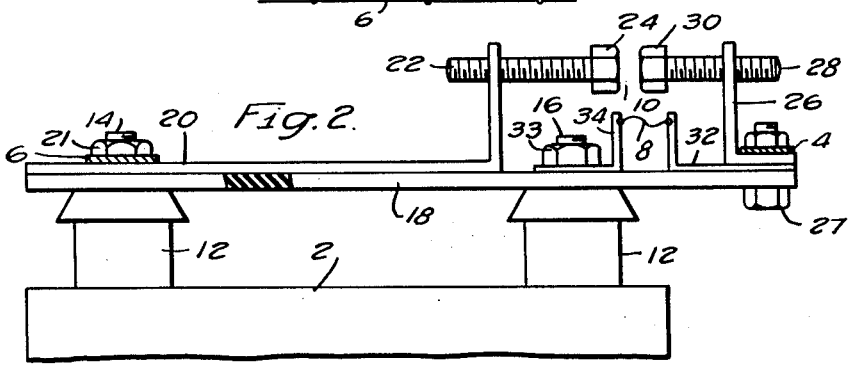
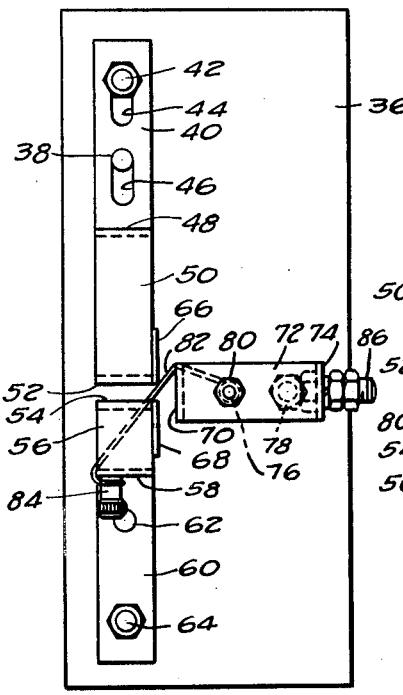
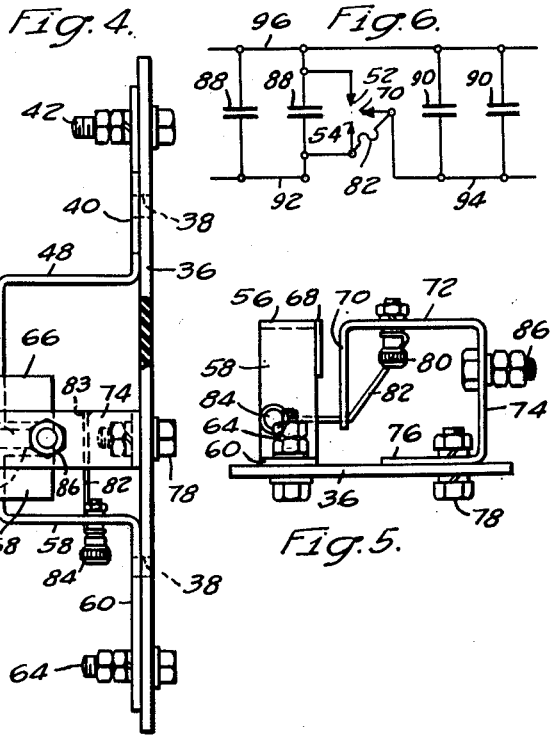
WITNESSES:
INVENTORS
James M. Wallace and
James B. Owens.
BY
Ralph H. Swingle
ATTORNEY Patented Nov. 15, 1949

2,488,454

UNITED STATES PATENT OFFICE 2,488,454

PROTECTION OF PARALLEL-CONNECTED CONDENSERS

James M. Wallace, East McKeesport, and James B. Owens, Pittsburgh, Pa., assignors to Westinghouse Electric Corporation, East Pittsburgh, Pa., a corporation of Pennsylvania Application May 10, 1946, Serial No. 668,976

3 Claims. (Cl. 175—294)

1

This invention relates, generally, to electric circuit protective devices and, more especially, to such devices arranged for the protection of parallel-connected capacitors.

One application of this invention is for the protection of electrical apparatus where a number of devices, such as capacitors are connected in parallel. Such capacitors are normally charged to some given potential, and when a fault occurs in one of the capacitors, all of the remaining capacitors will discharge into the faulted capacitor. Such a discharge of energy may result in rupture of the casing of the faulted capacitor with consequent damage to adjacent equipment and hazard to personnel. Attempts have been made to protect faulted capacitors by the use of series connected fuses, but it has been found that such fuses do not prevent the current flow but operate to isolate the faulted device only after the discharge of the parallel-connected capacitors has occurred.

Accordingly, one object of this invention is to provide novel means for by-passing a faulted capacitor in a group of parallel-connected capacitors.

Inasmuch as this invention contemplates the protection of other types of apparatus and of single units where it is desirable to prevent currents above a predetermined magnitude from passing through the apparatus, a more general object of this invention is to provide a novel structure for by-passing an electric circuit in response to the flow of current in the circuit above a predetermined value.

Another object of this invention is to provide novel means for by-passing a faulted part of an electric circuit in response to the flow of fault current.

A more specific object of this invention is to provide a gap in an electric circuit correlated in a novel manner with overload responsive means in another circuit to cause said gap to break down in response to the flow of current in such other circuit greater than a predetermined value.

Still another object of this invention is to provide a novel arrangement of a gap and fuse such that blowing of the fuse lowers the breakdown voltage of the gap.

These and other objects of this invention will become more apparent upon consideration of the following detailed description of preferred embodiments thereof when taken in connection with the attached drawing, in which:

Figure 1 is a diagrammatic view illustrating the manner of connecting protective devices constructed in accordance with this invention with a plurality of parallel-connected capacitors;

Fig. 2 is a side elevation view of a protective device, which may be used in the manner shown in Fig. 1;

Fig. 3 is a top plan view of a modified form of protective device;

Fig. 4 is a side elevation view of the device shown in Fig. 3;

Fig. 5 is an end view of the protective device shown in Figs. 3 and 4; and

Fig. 6 is a diagrammatic view illustrating the circuit with which the protective device shown in Figs. 3, 4 and 5 may be used for protecting a bank of parallel-connected capacitors.

Fig. 1 illustrates a circuit wherein a plurality of capacitors 2 are connected in parallel with conductors 4 and 6. Each capacitor has a fusible element 8 connected in series therewith, and the series arrangement of fusible element 8 and its associated capacitor 2 are paralleled by a gap 10.

One structure embodying the protective arrangement comprising fusible element 8 and gap 10 is shown in Fig. 2 and comprises a support 18 of insulating material, preferably a molded insulating material, adapted to be mounted directly on a capacitor 2. The capacitor 2 is illustrated as having terminal bushings 12 extending from the top thereof, with these bushings having terminal studs 14 and 16, respectively, extending therefrom and adapted to extend through apertures in support 18 for the protective device. An angle bracket 20 is adapted to be secured on one end of support 18 by a nut 21 on capacitor terminal stud 14, and a line conductor 6 may also be secured in place by nut 21. Bracket 20 has an outwardly extending portion for receiving a bolt 22 having a head 24 forming one electrode of gap 10. A second bracket 26 and a second line conductor 4 are adapted to be secured to the other end of support 18 as by a bolt 27, and the upstanding portion 26 of this bracket threadedly receives a bolt 28 having a head 30 forming the other electrode of gap 10. A fuse-supporting angle bracket 32 is also adapted to be secured to support 18 by bolt 27, and this bracket cooperates with a similar bracket 34 secured to support 18 by nut 33 on capacitor terminal stud 16, to support between the upstanding portions of brackets 32 and 34 the fusible wire 8.

The operation of the protective device illustrated in Fig. 2 will be apparent by reference to the circuit shown in Fig. 1. It will be noted that the fusible wire 8 (Fig. 2) is of the open type and is mounted directly below gap 10. This particular relationship of fusible wire 8 and gap 10 facilitates break-down of the gap when the fusible wire melts so that energy flows into the capacitor associated with the protective device, in the event it becomes faulted, is effectively prevented, because the energy will by-pass the capacitor by way of gap 10. As soon as any capacitor 2 develops a fault, the excess current which tends to discharge from the other parallel capacitors into the faulted one will melt fuse wire 8, and the resulting arc will ionize the gas between the upstanding portions of fuse-supporting brackets 32 and 34 and this ionized gas will be blown upward into the space between electrodes 24 and 30 of the gap 10 by the magnetic loop effect existing between the fuse terminals. The presence of ionized particles in gap 10 obviously lowers the break-down voltage of this gap and permits it to arc over very quickly after a fault occurs in the associated capacitor. It is apparent that all fuse wire 8 is called upon to do is to melt, it not being required that it interrupt the fault current, because as soon as the fuse wire 8 melts, it causes gap 10 to break down, and the fault current then by-passes the faulted capacitor and thus prevents destruction thereof and damage to its surroundings.

The particular protective device shown in Figs. 3, 4 and 5 is mounted on a supporting plate 36 of insulating material, which may be of a material similar to that of supporting plate 18 shown in Fig. 2. Supporting plate 36 is provided with apertures 38 spaced apart a distance corresponding to the terminal studs of a capacitor for mounting the supporting plate directly on a capacitor. One bracket, having a base 40 is adapted to be secured on support 36 adjacent one end thereof, at one side of the supporting plate being secured to the plate by a bolt 42 passing through a slot 44 provided in the bracket base 40. Bracket base 40 is provided with a second slot 46 adapted to coincide with mounting aperture 38 in the support plate. The bracket base 40 terminates inwardly in an upstanding portion 48, and this terminates in an outer support portion directed at right angles thereto which supports an outer electrode portion 52 directed inwardly toward supporting plate 36. The electrode portion 52 is adapted to be spaced from an opposed electrode portion 54 on a second bracket, with electrode portion 54 extending inwardly from an outer supporting part 56 integral with an upstanding part 58, which in turn is integral with the bracket base 60 secured to the supporting plate 36 as by a bolt 64. Bracket base 60 is provided with an aperture 62 aligned with mounting aperture 38 in base 36. Electrode plates 66 and 68 are secured, as by welding, brazing or the like, to the sides of bracket portions 50—52 and 54—56, for a purpose to be described.

A third bracket having an electrode portion 70 in spaced opposed relation with side electrode plates 66 and 68 is integral with an outer supporting portion 72, which in turn is integral with an upstanding part 74 and a bracket base 76, which is secured to supporting plate 36 as by a bolt 78 at one side of the supporting plate.

A binding post 80 is provided on the outer supporting portion of the third bracket for securing one end of a fusible wire 82, with the fusible wire leading from this binding post through a notch 83 provided in the electrode portion 70 of the third bracket, across to the outer side of upstanding part 58 of the second bracket where it is secured to a binding post 84. The third bracket may be provided on its upstanding portion 74 with a terminal bolt 86 to which a circuit conductor may be secured.

It will be observed that in the device illustrated in Figs. 3, 4 and 5, fusible wire 82 is again of the open type and is located directly below the gaps formed by electrode portions 52, 54 and 70, so that when the fusible wire 82 melts, the ionized gases formed are directed into the gaps to lower the break-down voltage thereof in the same manner previously described in connection with the embodiment of the invention shown in Fig. 2.

The device shown in Figs. 3, 4 and 5 is designed particularly so that each capacitor is not required to have an individual protective device since the device shown in Figs. 3, 4, and 5 may be used to protect a section of a bank of parallel-connected capacitors. Thus, as shown in Fig. 6, capacitors 88 are connected in parallel circuit relation between a conductor 96 and a conductor 92. Similarly, capacitors 90 are connected in parallel circuit relation between conductor 96 and a conductor 94. The protective device illustrated in Figs. 3, 4 and 5, in effect, sectionalizes the capacitors 88 and 90 being mounted, by way of illustration, on capacitor 88, with fusible wire 82 connecting conductors 92 and 94, with electrode portion 70 being connected to conductor 94, with electrode portion 54 being connected with conductor 92 and one terminal of capacitor 88, and with electrode portion 52 being connected with conductor 96 and the other terminal of capacitor 88. With the protective device connected in circuit in the manner shown in Fig. 6, it will be apparent that should a capacitor 88 develop a fault, the flow of energy from capacitors 90 to the faulted capacitor will cause fusible wire 82 to melt and immediately thereafter lower the break-down voltage between the electrodes 52, 54 and 70. In this case, the lowest impedance circuit being that including the gap between electrodes 52 and 70, this gap will carry most, if not all, of the energy from capacitors 90 to thereby by-pass the faulty capacitor 88. Moreover the energy from the unfaulted capacitor 88 will discharge across the gap between electrodes 52 and 54.

While only two capacitors are illustrated in Fig. 6 as being sectionalized by the protective device shown in Figs. 3, 4 and 5, this diagram is purely illustrative and, obviously, more than two capacitors may be included in each section to be protected by a single protective device, and in cases where a large number of capacitors are connected in parallel a correspondingly large number of protective devices may be used to divide the parallel capacitors into a number of sections. Each section of the capacitor bank may include a number of capacitors depending upon the amount of energy available from each capacitor. When this amount of energy becomes of dangerously high value, then protective devices constructed in accordance with this invention should be used to sectionalize the bank of capacitors so the amount of energy in each section will be reduced to a safe value.

The protective devices disclosed herein are constructed to operate extremely rapidly to prevent excess energy flow through a device being protected by shunting the device as soon as the excess energy appears in the circuit, and this is accomplished by the operation of an overload responsive means (a fuse wire in this instance)

cooperating with a parallel gap in such a manner as to lower the break-down voltage of the gap when the overload responsive means operates to open the circuit to the device being protected, so that the excess energy is able to flow immediately around the device being protected by way of the arc gap. While the devices are illustrated herein particularly for use with parallel connected capacitors for the protection of a faulted capacitor, it is contemplated that these devices may be used to protect any electrical apparatus from the flow of excess energy from the circuit in which it is connected.

Having described preferred embodiments of the invention in accordance with the Patent Statutes, it is desired that this invention be not limited to the particular embodiments disclosed herein, inasmuch as it will be obvious to persons skilled in the art that changes and modifications may be made in these embodiments without departing from the broad spirit and scope of this invention. Accordingly, it is desired that this invention be interpreted as broadly as possible and that it be limited only as required by the prior art.

We claim as our invention:

1. Protective means for electrical apparatus and circuits having a pair of terminals comprising, spaced electrodes forming a gap connected with said terminals, respectively, a third electrode connected with a supply conductor for said apparatus and spaced from at least one of said first two-mentioned electrodes to form a second gap, means automatically responsive to the passage of currents above a predetermined value therethrough to open the circuit, and said current-responsive means being connected between said third electrode and one of said first two-mentioned electrodes, and means whereby the ionized particles present due to the arc formed by operation of said circuit opening means to open the circuit are brought into proximity with said gaps to lower the break-down voltage thereof and cause at least one of said gaps to break down and by-pass said apparatus.

2. A protective system comprising, a pair of line conductors, a plurality of capacitors connected in parallel circuit relation with said line conductors, means connected in series circuit relation with one of said line conductors and being automatically responsive to the passage therethrough of currents above a predetermined value to open the circuit to a predetermined group of said capacitors, spaced electrodes comprising a gap with said electrodes connected across said line conductors at said predetermined group of capacitors but ahead of said circuit opening means, and means whereby the ionized particles present due to the arc formed by operation of said circuit opening means to open the circuit are brought into proximity with said gap to lower the break-down voltage thereof and cause said gap to break down and by-pass said predetermined group of capacitors.

3. A protective system comprising, a plurality of parallel-connected capacitors, means automatically responsive to the passage therethrough of currents above a predetermined value to open the circuit to a predetermined group of said capacitors, spaced electrodes comprising a gap with said electrodes connected across said predetermined group of capacitors ahead of said circuit opening means, a third electrode forming with one of the first two mentioned electrodes a gap connected across said predetermined group of capacitors behind said circuit opening means, and means whereby the ionized particles present due to the arc formed by operation of said circuit opening means to open the circuit are brought into proximity with said gaps to lower the break-down voltage thereof.

JAMES M. WALLACE.
JAMES B. OWENS.

REFERENCES CITED

The following references are of record in the file of this patent:

UNITED STATES PATENTS

| Number | Name | Date |
|---|---|---|
| 420,984 | Bayne | Feb. 11, 1890 |
| 1,271,407 | Wolff | July 2, 1918 |
| 1,769,091 | Wichert | July 1, 1930 |
| 1,988,683 | Diehl | July 22, 1935 |
| 2,134,470 | Conrad | Oct. 25, 1938 |
| 2,157,886 | Cuttino | May 9, 1939 |
| 2,224,749 | Slepian | Dec. 10, 1940 |
| 2,389,007 | Strang et al. | Nov. 13, 1945 |

FOREIGN PATENTS

| Number | Country | Date |
|---|---|---|
| 17,526 | Sweden | May 7, 1904 |
| 210,014 | Great Britain | Jan. 24, 1929 |
| 478,722 | Germany | July 2, 1929 |
| 599,119 | Germany | June 25, 1934 |

OTHER REFERENCES

Radio Digest, publication, January 13, 1923; page 11; 175-30 Lit.